United States Patent

Marchesseault et al.

[11] Patent Number: 5,848,609
[45] Date of Patent: Dec. 15, 1998

[54] DIGITAL VALVE POSITIONER

[75] Inventors: Richard R. Marchesseault, Marlborough; Sohrab Omidbakhsh, Shrewsbury; Richard F. Reiland, Ashland, all of Mass.

[73] Assignee: Worcester Control Licenseco Inc., Wilmington, Del.

[21] Appl. No.: 753,527

[22] Filed: Nov. 26, 1996

[51] Int. Cl.$^6$ .................................................. F16K 51/00
[52] U.S. Cl. ...................................................... 137/624.11
[58] Field of Search ........................ 251/129.04; 137/86, 137/487.5, 624.11

[56] References Cited

U.S. PATENT DOCUMENTS

| 5,197,328 | 3/1993 | Fitzgerald | 137/487.5 X |
| 5,363,874 | 11/1994 | Henszey et al. | 137/487.5 X |
| 5,549,137 | 8/1996 | Lenz et al. | 137/487.5 X |
| 5,588,636 | 12/1996 | Eichholz et al. | 251/129.04 X |

OTHER PUBLICATIONS

Operating Instruction Manual, Siemens Sipart PS 6DR3001–1N/E–2N/E.

Primary Examiner—Kevin Lee
Attorney, Agent, or Firm—Pollock, Vande Sande & Amernick

[57] ABSTRACT

A digital positioner is used to control and operate an AC electric valve actuator. A valve interface control program (ICP) provides a PC-based interface to the valve positioner or positioners. The ICP allows parameter modification, monitors alarm conditions, and provides a display of calibration data.

The positioner has a security code to prevent unauthorized access; adjustable independent valve open and close ramp times; electronic valve actuator travel limits; programmable setpoint direction; programmable signal split range; manually adjustable deadband and an auto-adjusting setting; and high positioner resolution.

The ICP can command the positioner to do the following: set the value of a specified parameter; read the value of a specified parameter; control the positioner setpoint from a remote computer; request the positioner to return the present status; read the byte value in a specified EEPROM location; set the value of a specified location in EEPROM memory; and select system operating mode.

8 Claims, 15 Drawing Sheets

Microfiche Appendix Included
(1 Microfiche, 199 Pages)

DIGITAL VALVE POSITIONER

A copy of the computer software for an embodiment of this invention is provided in the attached microfiche appendix (199 frames).

BACKGROUND OF THE INVENTION

The invention relates to a positioner for a valve actuator, and more particularly to a digital positioner used to control and operate an AC electric valve actuator.

As industry installs more and more automation in order to try to maintain and control costs and quality, the need for a high resolution and easily configured valve positioner becomes more important. Existing units in the marketplace are primarily analog. They are difficult to adjust, as the adjustments are very sensitive and prone to thermal drift, and require frequent fine manual tuning at the installed unit. The digital units currently available lack the flexibility of tuning and programming which reduces their utility to standard applications.

Thus, it is an object of the present invention to provide a digital positioner which provides flexibility in tuning and programming.

It is another object of the present invention to provide a positioner for a valve actuator which is easy to adjust.

It is another object of the present invention to provide a positioner which is not prone to thermal drift.

It is another object of the present invention to provide a positioner that does not require fine manual tuning.

SUMMARY OF THE INVENTION

The invention overcomes the problems noted above by providing a microprocessor based valve positioner that is easy to program and calibrate. A valve interface control program (ICP) provides a PC-based interface to the valve positioner or positioners. The ICP allows parameter modification, monitors alarm conditions, and provides a display of calibration data.

The positioner has easy push button calibration and programming, as well as programmable operating parameters. It can operate from either an analog input signal or an RS-485 two wire communication link (or both). It provides an ASCII text area in EEPROM in which the user can enter valve data.

The invention provides a number of features, including a security code to prevent unauthorized access; adjustable independent valve open and close ramp times; electronic valve actuator travel limits; programmable setpoint direction; programmable signal split range; manually adjustable deadband and an auto-adjusting setting; and high positioner resolution.

The ICP initiates all communications with the valve positioners, which in turn control the movement of the valves. The ICP sends a command packet to a specifically addressed, on-line positioner, and then waits to receive a response from the addressed unit. If no response is received within a timeout period, or if an incorrect unit address is received, the ICP assumes no positioner is on-line. If a valid command packet is received, but does not require data to be returned, an acknowledge (ACK) packet is returned. If a command packet is received with a bad Cyclic Redundancy Check (CRC), the receiving unit(s) does not respond. If a command packet is received by a positioner and has a good CRC but has some invalid or out of range data, the positioner responds with a negative acknowledge (NAK) packet.

The ICP can command the positioner to do the following: set the value of a specified parameter; read the value of a specified parameter; control the positioner setpoint from a remote computer; request the positioner to return the present status; read the byte value in a specified EEPROM location; set the value of a specified location in EEPROM memory; and select system operating mode.

DETAILED DESCRIPTION OF THE PREFERRED EMBODIMENT

Figure 1:
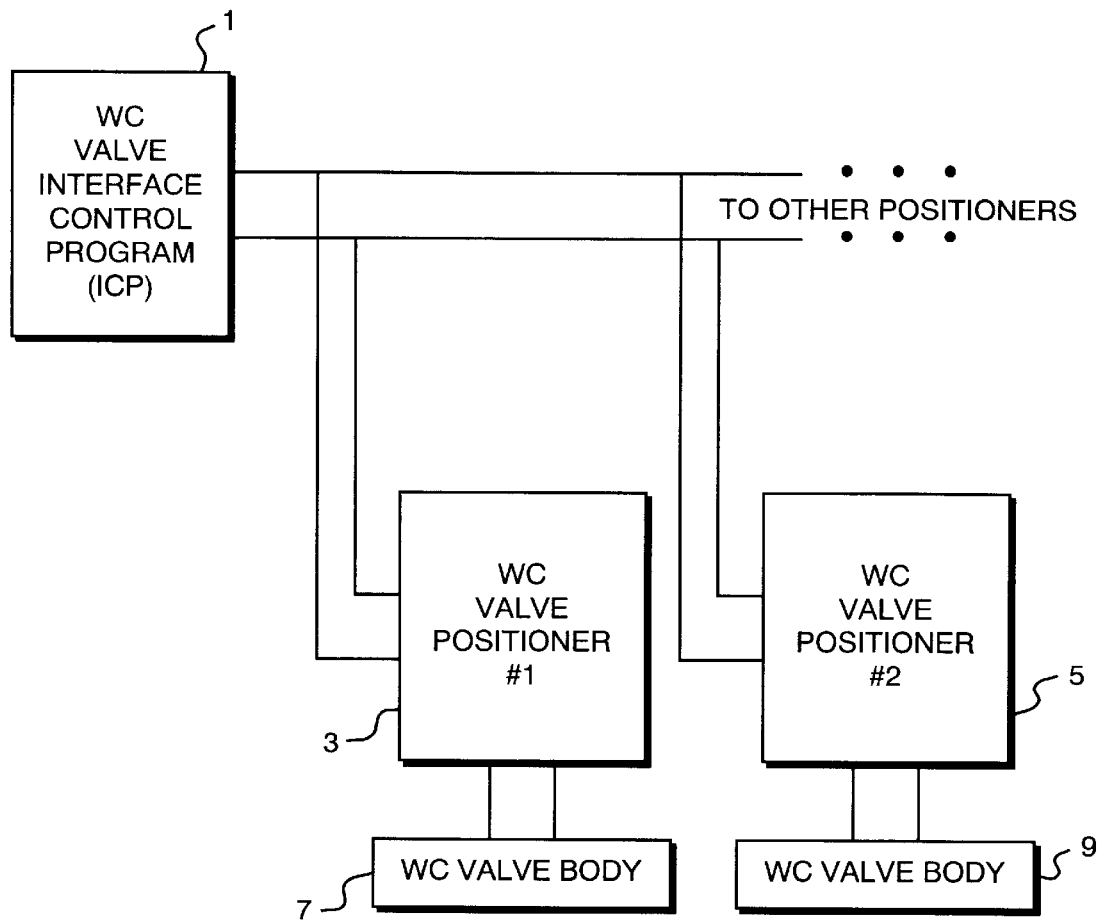
FIG. 1 is a schematic diagram of the ICP and attached valve positioners and valves.
Figure 17:
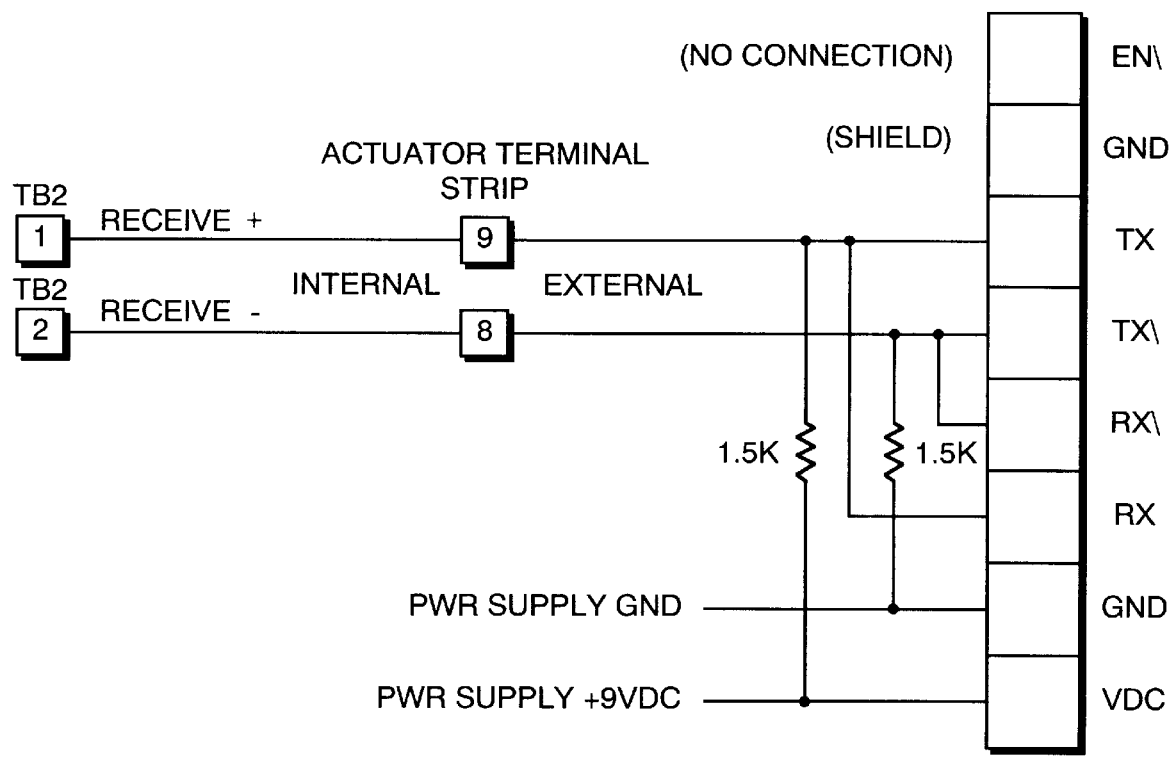
FIG. 17 shows a sample RS-485 connection.

FIG. 1 shows a schematic diagram of the Interface Control Program (ICP) 1, the attached valve positioners 3 and 5 and the corresponding valve bodies 7 and 9. The purpose of the ICP 1 is to provide a PC-based interface to the valve positioners 3 and 5. The ICP may be any computer program running a DOS operating system, including a PLC (programmable logic controller). The ICP 1 allows a computer to communicate with the positioners 3 and 5 over the RS 485 link (or an analog 4–20 ma signal). The RS-485 bus can accommodate up to 32 positioners at one time, and up to 255 positioners when using repeaters. A sample RS-485 connection is shown in FIG. 17.

The ICP 1 transmits commands to the attached positioner 3 and 5. The positioners 3 and 5 receive only commands from the ICP 1 and send only data to the ICP 1. All serial communications are asynchronous and occur at a rate of 9,600 bits per second, with eight (8) data bits, one (1) stop bit and no parity. When the ICP 1 sends a command on the 2-wire RS-485 bus, it must enable its driver to drive the bus. Therefore, when the ICP 1 is receiving a response, it disables its driver and enables its receive. The ICP 1 is written to use the RTS line to control transmitter enable and disable.

The ICP 1 initiates all communications with the valve positioners by sending a command packet 11 (FIG. 2) to a specifically addressed, on-line positioner. The positioner responds by returning one of the following: requested data; an acknowledge packet (ACK) (FIG. 15); or a negative acknowledge packet (NAK) (FIG. 16). If the positioner does not exist, or becomes inoperable, no response is returned to the ICP 1.

After a command packet is sent, the ICP 1 waits to receive a response from the addressed positioner. If no response is received within a timeout period, or if an incorrect unit address is received, the ICP 1 assumes no positioner is on-line. If a valid command packet is received, but does not require data to be returned, an ACK packet (FIG. 15) is returned. If a command packet is received with a bad CRC, the receiving unit(s) does not respond. If a command packet is received by a positioner and has a good CRC, but has some invalid or out of range data, the positioner responds with a NAK packet (FIG. 16).

For the positioner, packet frames are detected using an eight (8) millisecond timeout period. Packet bytes are received into a buffer continuously until no bytes are received for 8 milliseconds. At that time, the packet will be processed.

When the 2-wire RS-485 bus is used to connect the positioner to the ICP 1, the last positioner on the bus should have a 120-ohm terminator across the two lines. If intermediate positioners are provided (i.e. between the control point and the last positioner on the bus), those positioners should have their terminator resistor removed.

Figure 2:
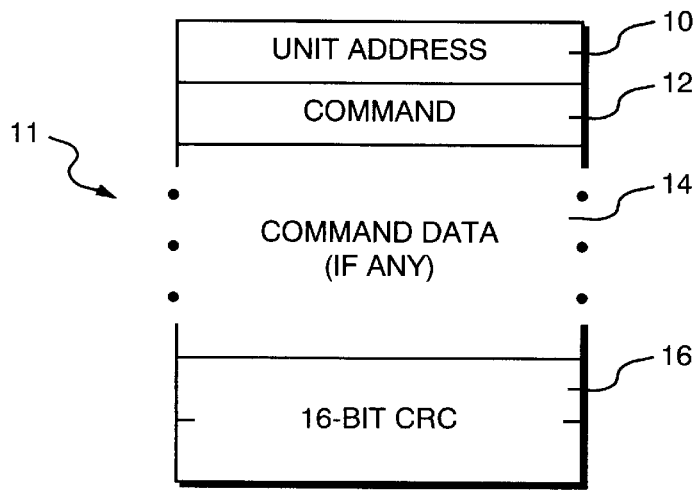
FIGS. 2–16 show communication packet configurations for the different command and response packets.

The commands are formatted as shown in FIG. 2 to include the following bytes: Unit Address (10), Command (12), Command Data (14) (if any) and a 16-bus CRC (16). The Unit Address byte 10 defines the communication address of the positioner. Address 0 is a "super address" at which all units respond regardless of their address setting. The ICP 1 only uses address 0 during special setup. Since the RS-485 bus can only accommodate 32 positioners at one time, no more than 32 positioners can be used at one time without a repeater.

The Command byte 12 is an instruction to the positioner. The Command Data field 14 contains data pertinent to the command. In commands which do not have any data, the Command Data 14 field does not exist. The 16-bit CRC field 16 is a 16-bit Cyclic Redundancy Check performed on all bytes of the packet (except the CRC bytes). The CRC is computed using the CRC-16 algorithm set forth below. If the receiving positioner computes a different CRC value for the packet, the packet is rejected without a response.

The CRC-16 is computed using the following algorithm:

```
crc = 0;    /* initialize CRC to zero */
for (k = 0; K < paksize; k++)   /*for each byte in packet */
{
    b = pakarray[k];   /* get byte from packet array */
    for (i = 0; i < 8; i++)
    {
        if ((b & 0x01) ^ (crc & 0x01))
            crc = (crc >> 1) ^ 0xA001;
        else
            crc = crc >> 1:
        B = B >> 1;   /* check next bit */
    }
}
```

The positioner can have up to 256 instructions. In the preferred embodiment, seven (7) instructions are provided. The ICP 1 can command the positioner to: a) set the value of a specified parameter (FIG. 3); b) read the value of a specified parameter (FIG. 4); c) control the positioner setpoint from a remote computer (FIG. 6); d) request the positioner to return the present status (FIG. 7); e) read the byte value in a specified EEPROM location (FIG. 10); f) set the value of a specified location in external EEPROM memory (FIG. 12); or g) select system operating mode (FIG. 13).

All packets sent and received contain the "unit address," which is the address of the positioner. The controller is not addressed in the response. Instead, the unit address is included in the response packet to insure the ICP 1 that it is communicating with the proper positioner.

Figure 3:
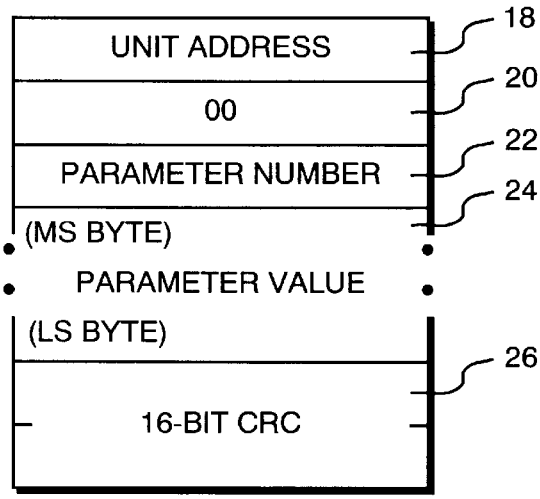

Turning now to the command packets, Command Code 00 is shown in FIG. 3. This command packet is used to set the value of a specified parameter. This packet is sent to the positioner any time a parameter changes. Its packet size is 5 bytes plus the value field. The positioner responds to this command with an ACK (FIG. 15) or NAK (FIG. 16) response. The Parameter Number field 22 is the number of the parameter to be written. Parameters are numbered sequentially starting at 0. The Parameter Value field 24 represents the data value of the parameter. The length of this field is the size appropriate for the parameter specified.

Figure 4:
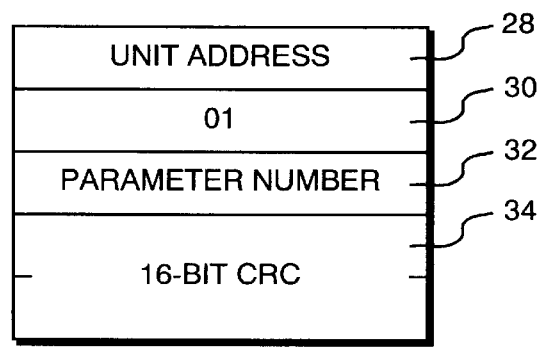
Figure 5:
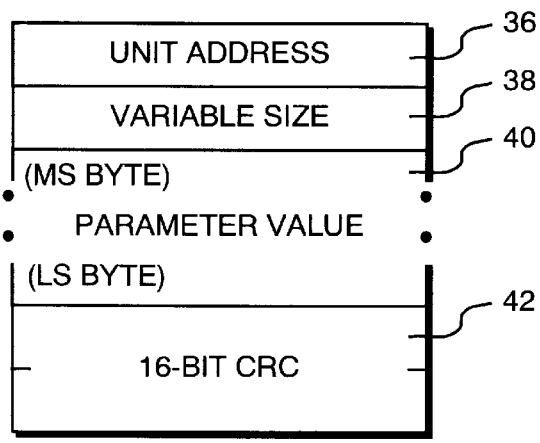

Command Code 01 is shown in FIG. 4. This command is used to read the value of a specified parameter. Its packet size is 5 Bytes. This command packet includes a Unit Address 28, a Command Code 01 (30), a Parameter Number 32, and a 16 bit CRC 34. The Response Packet to Command 01 is shown in FIG. 5. That Response Packet has a Unit Address 36, a Variable Size field 38 which describes the size of the variable in bytes, a Parameter Value field 40 which is the data value, and a 16-bit CRC 42.

Figure 6:
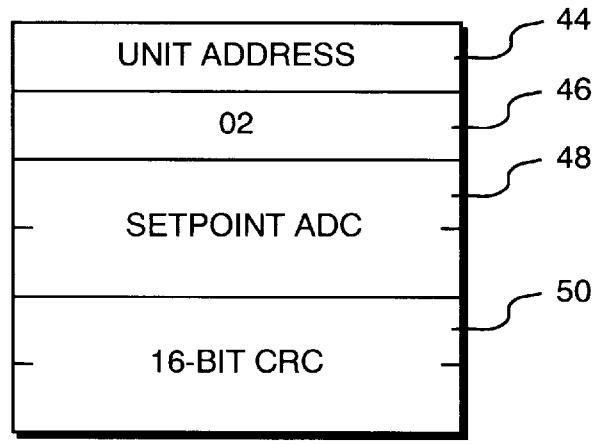

The Command Code Packet for Command Code 02 is shown in FIG. 6. This command is used to control the positioner setpoint from a remote computer. It includes a Unit Address 44, a Command Code 02 (46), Setpoint ADC 48, and a 16-bit CRC 50. The positioner uses the setpoint value as if it had been read as the input signal. The Setpoint ADC field 48 represents the A/D value the positioner would read for the input signal. The packet size of this command is six (6) bytes. The available responses to this command are ACK (FIG. 15) and NAK (FIG. 16).

Figure 7:
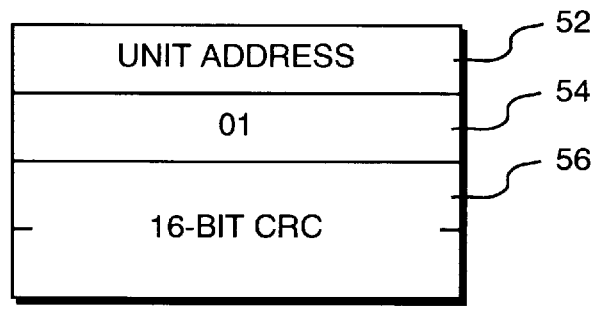
Figure 8:
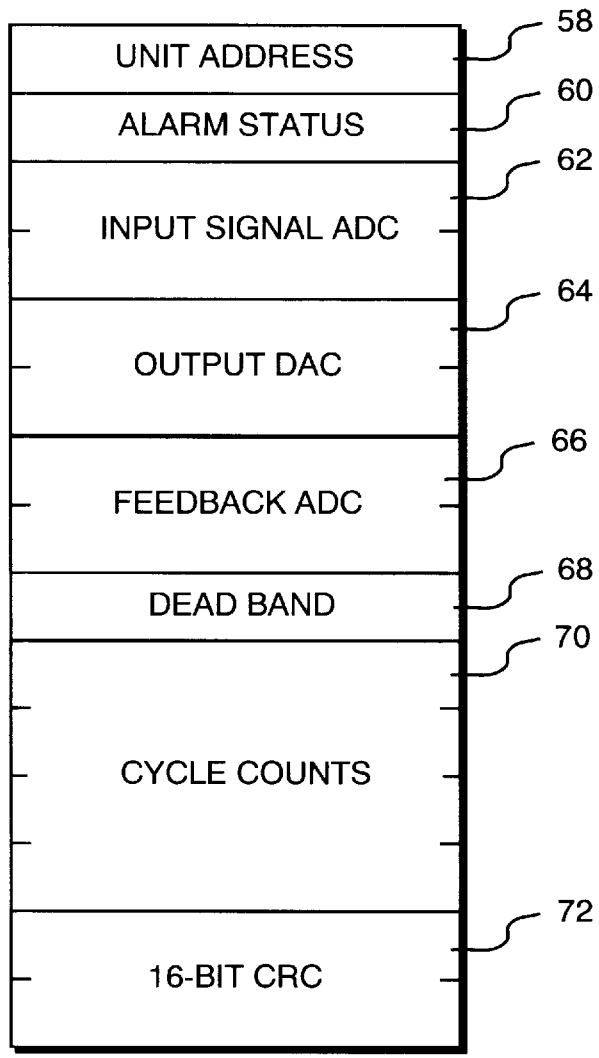
Figure 9:
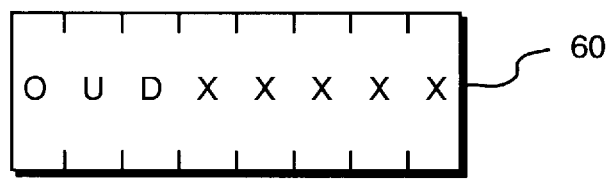

The Command Code Packet for Command Code 03 is shown in FIG. 7. This command packet requests the positioner to return the present status. Its packet size is four (4) bytes. It includes a Unit Address 52, the Command Code 03 (54), and a 16-bit CRC 56. The Response Packet for Command Code 03 is shown in FIG. 8. This Response Packet includes a Unit Address 58, Alarm Status 60, Input Signal ADC 62, Output DAC 64, Feedback ADC 66, Deadband 68, Cycle Counts 70, and a 16-bit CRC 72. The Alarm Status field 60 is shown in FIG. 9, where "d" indicates that the deviation alarm is active; "o" indicates that the over-travel alarm is active; and "u" indicates that the under-travel alarm is active. The Input Signal ADC field 62 is the A/D converter reading for the input signal. The Output DAC field 64 is the output (D to I) DAC value. The Feedback ADC field 66 is the A/D converter reading for the shaft position feedback pot. The Deadband field 68 is the actual deadband being used. This value is significant if the deadband has been programmed to the AUTO value. The Cycle Counts field 70 represents the number of cycles the positioner has travelled.

Figure 10:
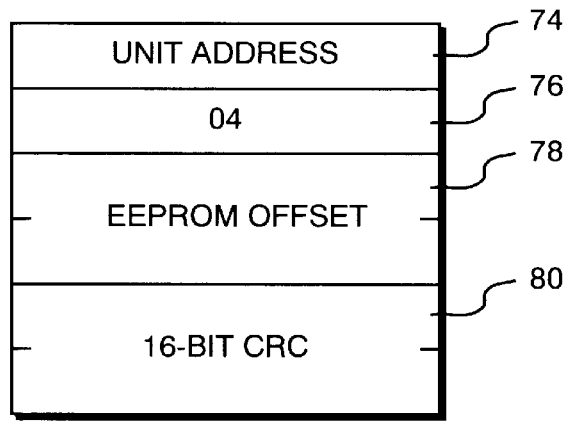
Figure 11:
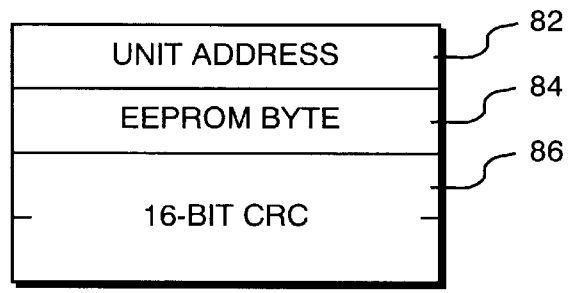

The Command Packet for Command Code 04 is shown in FIG. 10. This command is used to read the byte value in the specified EEPROM location. Only one byte of data is returned. The packet size of this command is five (5) bytes. It includes the Unit Address 74, the Command Code 04 (76), an EEPROM Offset field 78 and a 16-bit CRC 80. The EEPROM Offset field 78 is the offset from the beginning of EEPROM to read a byte of data. The Response Packet to Command Code 04 is shown in FIG. 11. It includes a Unit Address 82, EEPROM byte 84 and a 16-bit CRC. The EEPROM Byte 84 is the requested data byte.

Figure 12:
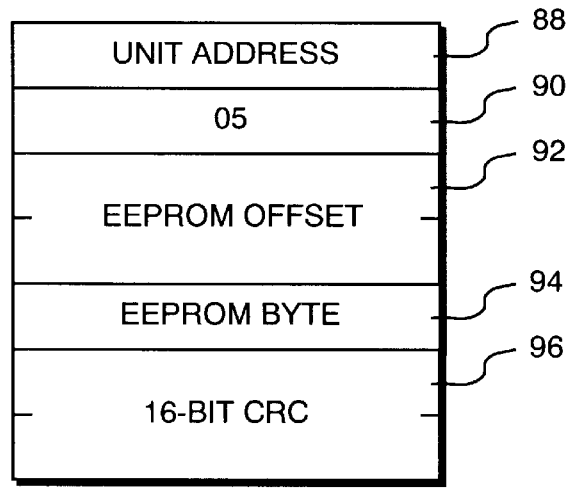
Figure 13:
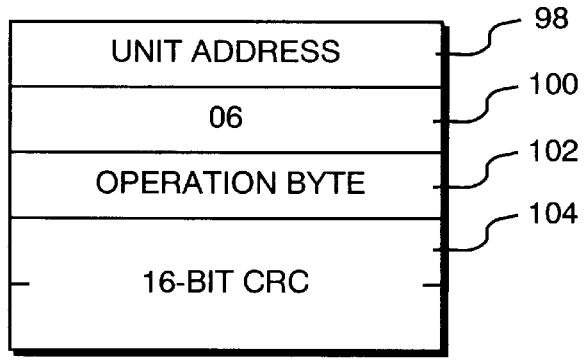

The Command Packet for Command Code 05 is shown in FIG. 12. This command packet is used to set the value of a specified location in EEPROM memory. The packet size of this command is six (6) bytes. It includes a Unit Address 88, the Command Code 05 (90), EEPROM Offset 92, EEPROM Byte 94 and a 16-bit CRC 96. The positioner responds to this command with an ACK (FIG. 15) or NAK (FIG. 16). The EEPROM Offset field 92 is the offset from the beginning of EEPROM to write a byte of data. The EEPROM Byte field 94 is the data to write to the specified location.

Figure 14:
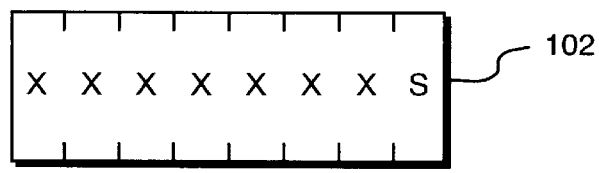

The Command Code Packet for Command Code 06 is shown in FIG. 13. This command packet is used to select the system operating mode. The packet size of this command is six (6) bytes. It includes a Unit Address 98, the Command Code 06, which is shown in the figure by reference numeral 100, Operation Byte 102 and a 16-bit CRC 104. The positioner responds to this command with an ACK (FIG. 15) or NAK (FIG. 16). The Operation Byte 102 is shown in FIG. 14 where "s" is the Input signal selector. The input signal selector "s" equals 1 when the system is in the ICP control mode, and "s" equals 0 when the system is in the current control mode.

As discussed above, all command packets sent by the ICP 1 require acknowledgement by the positioner. Commands that do not request data to be returned require an ACK packet for confirmation of reception. If the ACK packet is not received by the ICP 1, the ICP 1 assumes a positioner is not connected.

Figure 15:
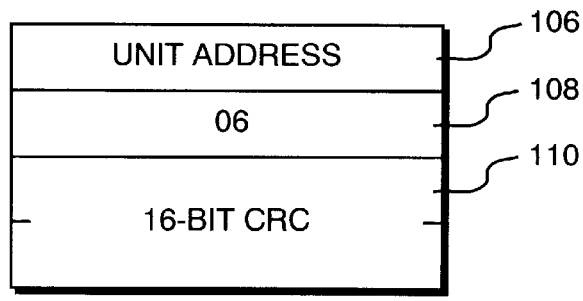
Figure 16:
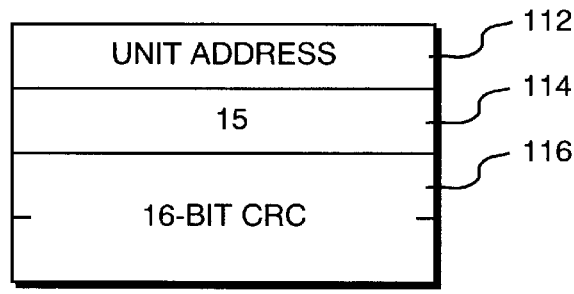

The Positive Acknowledgement (ACK) Packet is shown in FIG. 15. It is a response packet for those commands that are being positively acknowledged but which do not require a data response. The ASCII ACK character is returned with the 16-bit CRC. It includes the Unit Address 106, the ACK Code 06 (108), and a 16-bit CRC 110.

The Negative Acknowledgement (NAK) Packet is shown in FIG. 16. It is a response packet for those commands that were received with either an incorrect CRC, or which contained invalid data. The ASCII NAK character is returned with the 16-bit CRC. It includes the Unit Address 112, the NAK code 15 (114), and a 16-bit CRC 116.

Turning now to the positioner, a 4-digit LCD is mounted on the positioner board to provide data readout. Each LCD segment is controllable, which allows display of some letters in addition to all digits. Parameters are identified by names, not numbers. Provisions for numerical values with decimal points are made.

The Display Mode has two (2) modes of operation: Toggle Mode and Fixed Mode. In Toggle Mode, the display alternates between a parameter name and its value. In Fixed Mode, only the values appear on the display. While a parameter is being edited, one or more digits flash as the value of the parameter is displayed.

Three push-button switches on the positioner board are used for local data entry: SEL selects a parameter for editing or changing modes of operation; (arrow up) (hereinafter referred to as UP) increases the selected value or selects next parameter; (arrow down) (hereinafter referred to as DOWN) switches the flashing digit to the next digit to the rights, wrapping from right to left (or selects a previous parameter).

In the preferred embodiment, the valve position setpoint input signal is derived from either a 4–20 ma signal or from a digital RS-485 serial input. Valve position feedback to the digital positioner board is from a 1,000 ohm potentiometer geared to the actuator shaft. Circuits are on an AF-17 style board which fits inside the actuator housing.

Figure 18:
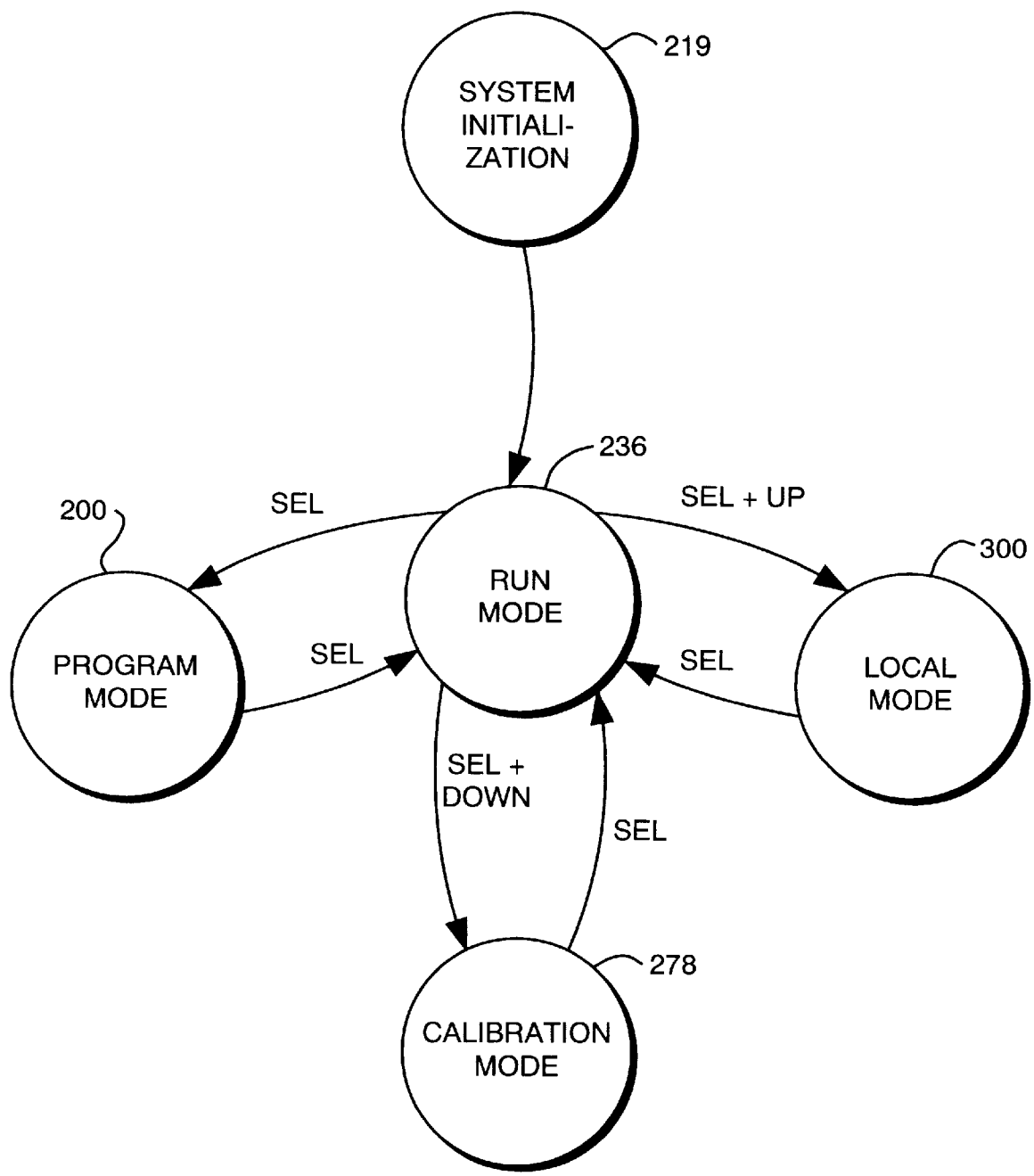
FIG. 18 shows the basic operating states of the positioner.
Figure 19:
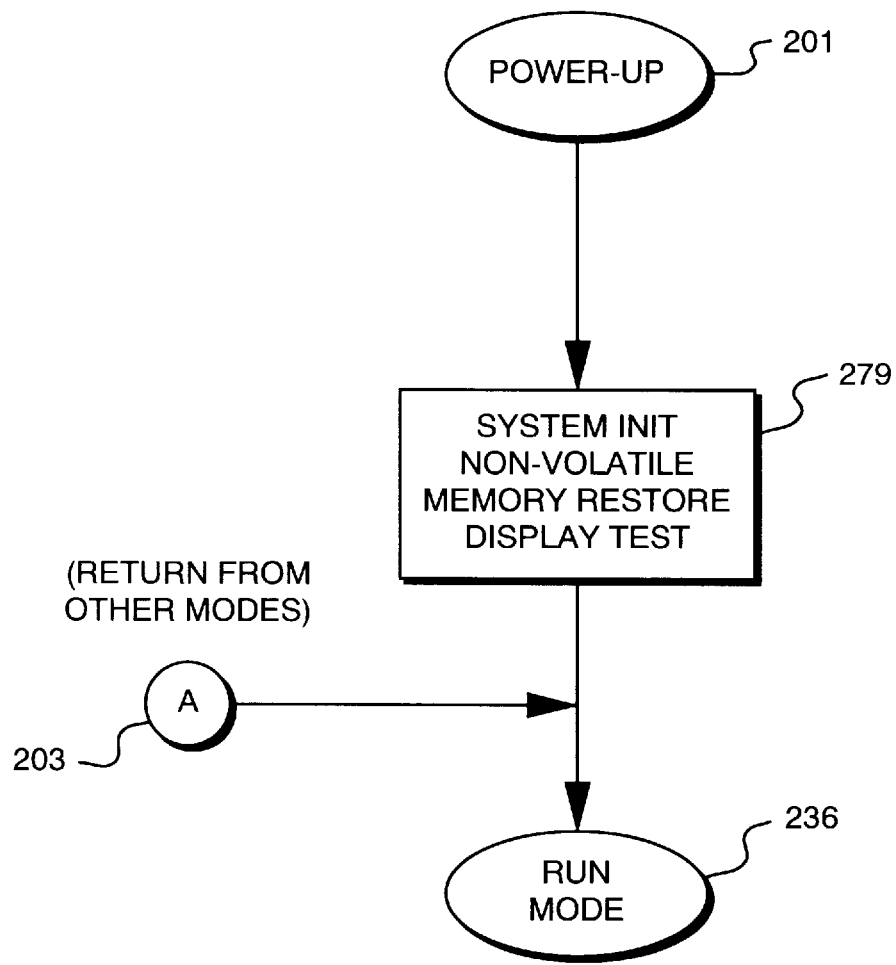
FIG. 19 shows the Power Up Control Flow Chart.
Figure 20:
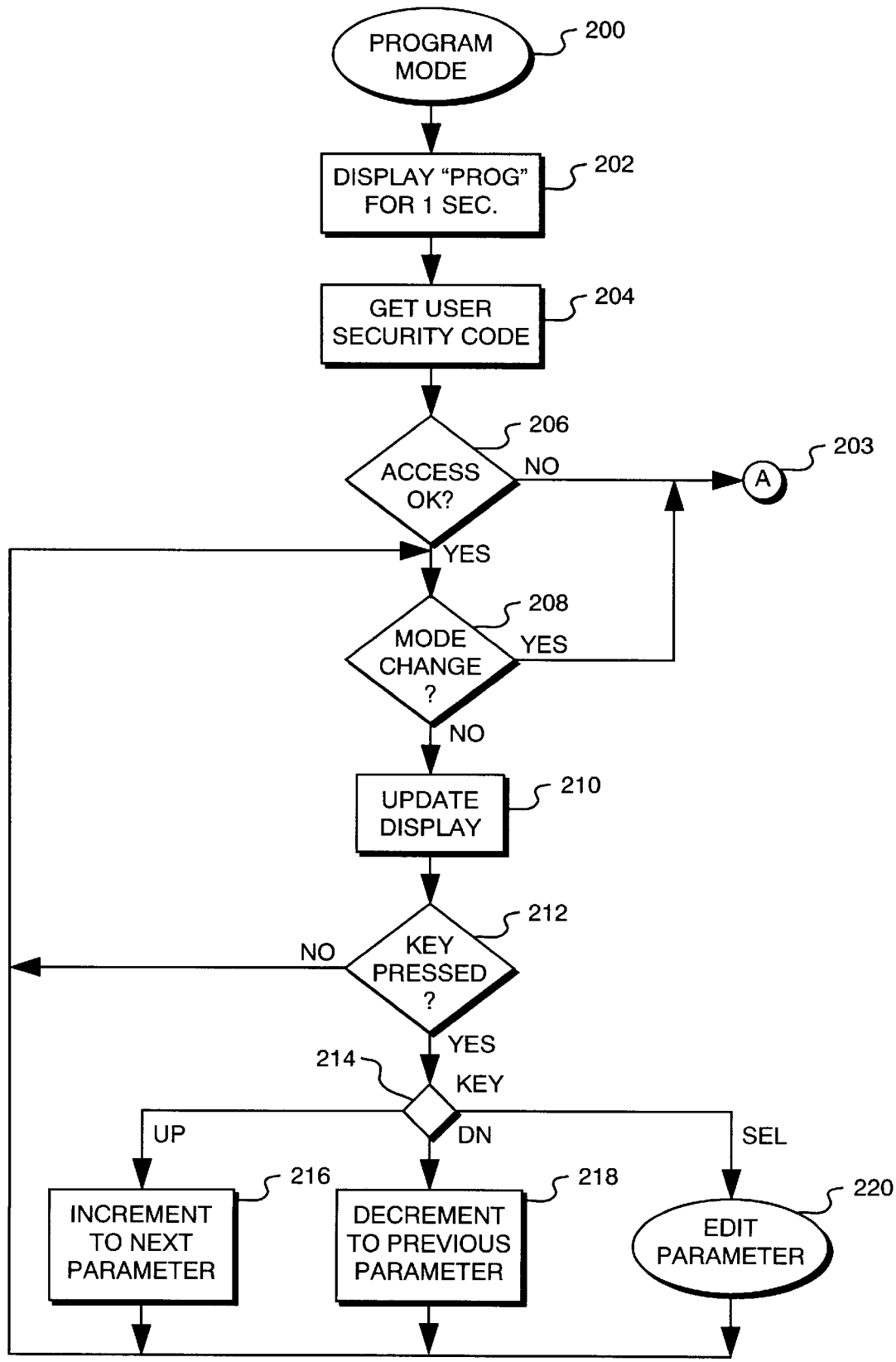
FIGS. 20(a) and (b) show the Program Mode Control Flow Chart.

The digital positioner has the following modes of operation: Run (FIGS. 23(a) and (b)), Local (FIG. 21), Program (FIGS. 20(a) and (b), and Calibration (FIG. 22). FIG. 18 shows the relationship between these modes, and the system initialization 279. After the system is initialized, the program enters Run Mode 236. From the Run Mode 236, the program can enter any of the other modes. The Power Up Control Flow Chart is shown in FIG. 19. After Power Up 201, the system is initialized 279 and enters the Rune Mode 236. The program can also enter the Run Mode 236 when it returns from other modes at (A) 201. In the Program Mode of operation, data is edited by pressing the SEL switch while the parameter name is alternating with its value. The display is then in the Fixed Mode, where one or more digits flash. With a single digit flashing, pressing the UP switch increases the digit value by 1, wrapping from 9 to 0. Pressing the DOWN switch causes the next digit to blink and allows it to be edited. Pressing the SEL switch stores the value in non-volatile memory, discontinues editing, and returns the display to the Toggle Mode. Displayed data cannot be edited in the Run Mode. Pressing the SEL switch in that mode causes the display to stop alternating and only the parameter value is displayed.

A. PROGRAM MODE

The Program Mode Control Flow Chart is shown in FIGS. 20(a) and (B). In the program mode, it is possible to change various parameters, including the Setpoint Direction, the Setpoint Split Range Start, the Setpoint Split Range End, etc. The Program Mode 200 is entered from the Run Mode 236 by pressing the on-board SEL switch for three (3) seconds. The display shows Prog for one (1) second and then the CodE screen appears 202. For all parameters discussed below, the display is in Toggle Mode, alternating between showing the parameter name for one (1) second, and then its value for one (1) second. Pressing the UP or DOWN switches in the Toggle Mode displays the next or previous parameter, respectively. Pressing the SEL switch while in the Toggle Mode enters the Fixed Mode of display where the value is altered. As explained above, values are edited by pressing the UP and DOWN switches (UP to increment digit and DOWN to advance to the next digit) until the desired value is obtained. Pressing the SEL switch while editing records the current value and the display to the Toggle Mode.

Before any parameters can be changed, a security code must be entered 204. This security code prevents access by unauthorized persons. The display on the security screen alternates between CodE and 0000. The correct security code number must be entered in order to gain access to the parameter entry screens. Legal security code values are 0001 to 9999. The security code is set to 1000 during manufacture. After the correct code is entered, any programmable parameter can be modified, including the security code itself. Once a security code is established, it cannot be displayed again while in the run mode.

Figure 20B:
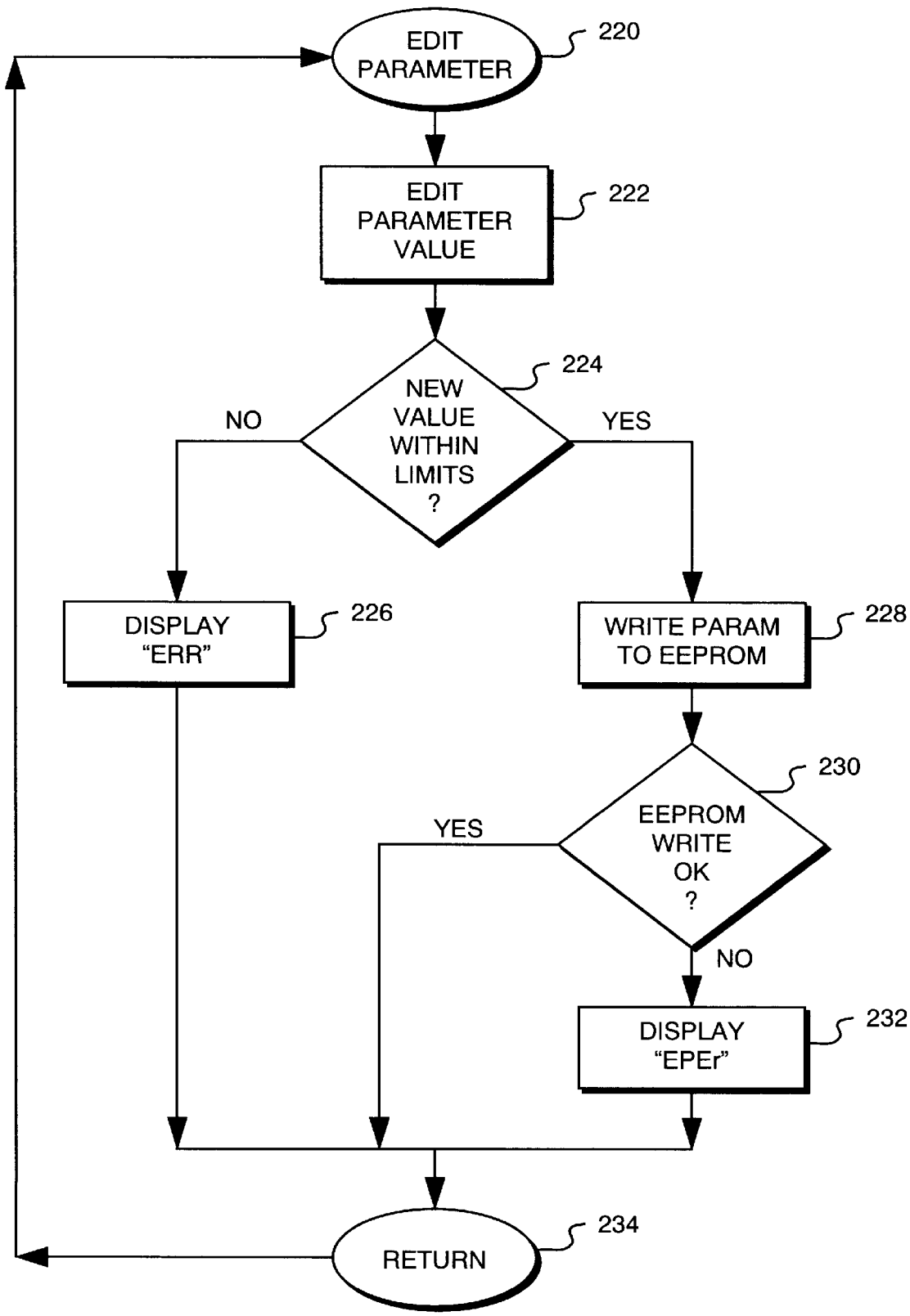

After the correct security code is entered, the program checks to see whether there is a mode change 208. If yes, it returns at (A) 203 to the Run Mode 236 (see FIG. 19). If there is no mode change, the program updates the display 210. The program then determines whether a key is pressed 212. If no key is pressed, the program returns to step 208. If a key is pressed, the program checks to see which key is pressed. If the UP key is pressed, the program increments to the next parameter 216. If the DOWN key is pressed, the program decrements to the previous parameter 218. If the SEL key is pressed, the program goes to the Edit Parameter Routine 220 shown in FIG. 20(b).

In the Edit Parameter Routine 220 the program edits the parameter value 222. The program then asks whether the new value is within the proper limits 224. If it is not, an error message "Err" is displayed, and the program returns to Edit Parameter 220. If the value is within the limits, the program writes the parameters to EEPROM 228, and then checks to see whether the EEPROM is OK. If it is not, an error message "EPEr" is displayed, and the program returns to Edit Parameter 220. If the EEPROM write is accurate, the program returns to Edit Parameter 220.

Returning now to FIG. 20(*a*) after the appropriate action is taken in response to the pressed key (step 216, 218, or 220), the program returns to step 208, and checks to see whether there is a mode change. If there is a mode change, the program continues through the program again. If not, it returns at (A) to the Run Mode 236.

Several parameters may be edited in the program mode. The Unit Address Screen display alternates between Addr and the communications address. The value may be edited using the UP or DOWN switches to select a value between 1 and 255.

The Output Current Range display alternates between Ocur and either 4–20 or 0–20. The value is edited using the UP or DOWN switches to select 0–20 or 4–20. 4–20 selects a 4–20 ma output current range. 0–20 selects a 0–20 ma output current range. A voltage output is achieved by connecting a resistor across the current output. The output current feedback is linear.

The Analog Setpoint (input) signal range is fixed.

The Setpoint Direction (rise/fall) display alternates between Sdir and either rise or FALL. rise selects direct acting positioner control where the actuator rotates in the counterclockwise direction (opens the valve) as the setpoint signal increases. The valve is closed (full clockwise) at the minimum setpoint signal value. FALL selects reverse acting positioner control where the actuator rotates in the counterclockwise (open) direction as the setpoint signal decreases. The valve is full counterclockwise (open) at the minimum setpoint signal value and full clockwise (closed) at the maximum setpoint signal value.

The positioner also incorporates split ranging, which is useful when more than one valve is used in a control system. For example, one actuator can be calibrated to open for an input signal between 4–12 ma and another to open for an input signal between 12 and 20 ma on the same current loop.

The Setpoint Split Range START Selection display alternates between SprS and its value. For a direct acting positioner, SprS specifies the start of the split range input signal for the full clockwise (closed) actuator position, and must be less than SprE. For a reverse acting positioner, SprS specifies the START of the split range input signal for the full counterclockwise (open) actuator position, and must be less than SprE. The setting can be anywhere from 0.0 to 99.9% of the input signal range in 0.1% increments.

A Setpoint Split Range END Selection display specifies the end of the split range input signal. The display on the Setpoint Split Range End Selection alternates between SprE and its value. For a direct acting positioner, SprE specifies the END of the split range input signal for the full counterclockwise (open) actuator position, and must be greater than SprS. For a reverse acting positioner, SprE specifies the END of the split range input signal for the full clockwise (closed) actuator position, and must be greater than SprS. The setting can be anywhere from 0.1 to 100.0% of the input signal range in 0.1% increments.

A Setpoint Ramp—Time to Open controls the time for the actuator to travel from the full closed (clockwise) to the full open (counterclockwise) position. The display on the Setpoint Ramp (Time to Open) alternates between OPEn and the selected time to open. Times from 0 to 200 seconds can be selected as the time for the actuator to travel from the full closed (clockwise) to the full open (counterclockwise) position. If "0" (or a time less than the counterclockwise travel time) is selected, the rate of response to a step change in the input signal is as fast as the valve actuator can operate. The slowest time to open is 200 seconds. The actuator runs to the setpoint at full speed and then brakes if the Time to Open time setting is less than that measured in the calibration routine.

A Setpoint Ramp—Time To Close controls the time for the actuator to travel from the full open (counterclockwise) to the full closed (clockwise) position. The display on the Setpoint Ramp (Time to Close) alternates between CLOS and the selected time to close. Times from 0 to 200 seconds can be selected as the time for the actuator to travel from the full open (counterclockwise) to the full closed (clockwise) position. If "0" (or a time less than the clockwise travel time) is selected, the rate of response to a step change in the input signal is as fast as the valve actuator can operate. The slowest time to close that can be selected is 200 seconds. The actuator runs to the setpoint at full speed and then brakes if the time to close time setting is less than that measured in the calibration routine.

A Setpoint Function tells the positioner the desired shaft positioning characteristic with respect to input signal. It can vary in a linear fashion as the input signal changes or it can be programmed as a curve. The Setpoint Function display alternates between Sfc and either Lin or FrE1, FrE2, FrE3, or FrE4. Lin causes the shaft position to vary in a linear fashion as the input signal changes (i.e. if the signal is at 50 percent, the shaft position is at 50 percent of the selected operating range). The FrE1–FrE4 curves allow 21 setpoint vertices to be set. In this way, a custom shaft positioning characteristic is entered. A vertices set (data point) is provided at 4 ma and then every 0.8 ma up to and including 20 ma. The vertices display as SL0 to SL20 and are displayed when one of the FrE1–FrE4 curves is chosen as the setting. The SL parameters are found in the menu between the PrSt parameter and the CodE parameter. The UP and DOWN switches are used to select and change the vertices setting. The factory installed default curve for the FrE1 setting is the 1:25 equal percentage curve. For the FrE2 setting, it is the 1:50 equal percentage curve. The factory default settings for the FrE3 and FrE4 curves are linear. Equal percentage means that for equal increments of valve rotation, the Cv (flow) increases by a given percentage over what it was at the previous setpoint.

A deadband is used to prevent oscillations about a setpoint resulting from small fluctuations in either the setpoint signal or the position feedback signal. The deadband represents a plus and minus percentage of the full range of either the input signal or the feedback signal. Fixed deadband values can be selected from 0.1 to 10.0 percent of range. The Positioner Deadband display alternates between Deba and the dead band value. When the DOWN switch is pressed and the right most digit is selected, the display shows Auto. Pressing SEL while on that screen will select Auto dead band. A deadband setting of Auto will allow constant automatic adjustment of the deadband in an adaptive fashion as required for best performance. This is the default and recommended setting. The manual setting becomes the lower limit for the auto setting.

The Loss of Signal Position and Time display alternates between SPOS and the position the valve will move to if there is a loss of signal (i.e. less than 2 ma) after the positioner has been operating normally. A HOLd option indicates that the positioner is to hold the last position in the event the input signal is lost. When a loss of signal occurs, the positioner always goes to the SPOS position. When the signal is restored, the positioner stays at the SPOS position for the time specified by the Spt parameter. As long as there is a loss of signal, the delay timer is set to the specified time. The delay actually begins when the signal is restored. If the Spt parameter is set to 0 seconds, restoration of the signal causes the positioner to work as normal with no time delay. The display alternates between Spt and the time (in seconds) that the SPOS position holds. During that time, the positioner ignores any input signal and holds the SPOS position. The time range is 0 to 9999 seconds. A time of 0 disables this option.

When power is first applied to the positioner, it goes to the position specified by the PPOS parameter for a time specified by the Ppt parameter. During that time, any input signal is ignored. The Power-On Position and Time display alternately displays PPOS and the position (in percent) the valve moves to when power is first applied. The actuator holds that position for the time specified in the next step. The position range is 0.0 to 100.0% and HOLd. A HOLd option specifies the positioner is to hold the last position (i.e. the actuator does not move). The display alternately displays PPT and the time (in seconds) that the PPOS position will be held. The time range is 0 to 9999 seconds. A time of 0 disables this option.

An Electronic Positioner Rotation Limits display alternatively displays Ya and its position value. Ya is the electronic lower rotation limit for shaft position at the start of the signal range. It can be set to a value between 0.0 and 100.0 in increments of 0.1 percent. Pressing the UP switch advances to the Ye parameter screen, which alternately displays Ye and its position value. Ye is the electronic upper rotation limit for shaft position at the end of the signal range. It can be set to a value from 0.0 to 100.0 in increments of 0.1 percent. If Ya is set at 20.0, the actuator shaft will never rotate further clockwise than 20 percent open. If Ye is set to 70 percent, the actuator shaft will never rotate further counterclockwise than 70 percent open. These electronic limits restrict the range of actuator shaft rotation. Ya must always be less than or equal to Ye. Ye must always be greater than or equal to Ya.

The Tight Valve Shut Off display alternately displays YCLS and its setting. YCLS specifies whether tight valve shutoff is desired when the input signal reaches the low end of its range. It is significant when the Ya function is set to a value other than 0.0 percent. The two choices are YES and no. As an example, if the actuator/valve is controlling fuel flow to a burner, Ya might be set to 30 percent as a low fire position, but a value between 4.1 and 4.2 ma the valve will fully close if YCLS is set to YES to allow maintenance to be performed on the burner.

The Full Open Operation of Valve display alternately displays YOPN and its setting. YOPN is used to specify whether the valve fully opens when the input signal reaches the upper end of its range. It is significant when the Ye function is set to a value of other than 100.0 percent. The two choices are YES and no. As an example, if Ye is set at 70 percent and YCLS is set to YES, then the actuator/valve will be 70 percent open at 19.8 ma. but will open fully when the signal is increased to 19.9 ma.

The Brake On Time display alternately displays br and the brake time. Actuator brake times between 0.10 and 0.99 seconds can be selected in 0.01 second increments. The actuator brake time begins after either the clockwise or counterclockwise signal to the actuator drive motors turns off. Any control signal change is ignored during the brake ON period. The brake time is set at 0.25 seconds during manufacture and is the recommended setting. Ideally, the brake ON time should be as short as possible to minimize motor heating while at the same time minimizing any overshoot caused by motor rotor inertia.

The Restore Default Values display alternately displays PrSt and no. If YES is selected instead of no, the factory default values for all parameters are selected. This flag is not a parameter but must be edited the same way to select YES. This is a momentary function and values can be altered after the default values have been selected. After the factory default values have been reloaded, the display once again displays no.

The Run Time Cycles for Maintenance display alternately displays CyS and the total number of seconds for the valve to travel from full counter-clockwise to full clockwise and then back to full counter-clockwise. This cycle time is measured in the cycle time calibration routine which is performed after the feedback potentiometer calibration routine. The microprocessor converts run time into cycles. The next screen displays accumulated cycles, CyCn. The number shown represents thousands of cycles. The display can show up to 9.999 million cycles. At higher cycle counts, less resolution is available on the display. Only whole cycles are displayed. With CyCn displayed, the user can press the SEL switch and the total begins flashing. At that point, holding down the down switch for four (4) seconds clears the total. Because the life of EEPROM is based on the number of write operations, only every 100 cycles will cause the total to be written to the non-volatile memory.

The positioner provides a number of alarm functions. A DEVIATION alarm becomes active if the valve does not move to the desired position within a certain time period. The time period is 10 seconds plus either the ramp time for the direction in which the actuator is moving, or the open/close time from calibration, whichever is greater. A Thermal alarm becomes activated if the DC motor driver circuit has overheated.

A means to set UPPER and LOWER rotation alarm limits on the actuator/valve shaft position is also provided. An alarm shall occur if the positioner rotates beyond either the upper or lower set limit. The range of rotation limits is between 0 and 100 per cent (%). An example of typical alarm limits would be 20 per cent (%) for LOWER and 80 per cent (%) for UPPER. An opto isolated open collector and emitter transistor is on whenever any alarm condition exist. Two alarm parameters are programmable:

Ahi: 0.0 to 100.0 per cent (%) for the upper rotation alarm.

Alo: 0.0 to 100.0 per cent (%) for the lower rotation alarm.

The AdE value is also shown with the programmable parameters to show the deviation alarm time. This value cannot be edited.

The following default parameters may be loaded in Program Mode.

| Parameter | Default Value |
| --- | --- |
| Output Current | 4–20 ma |
| Setpoint Direction | RISE |
| Split Range Start | 0% |
| Split Range End | 100% |
| Ramp Open Time | 0 (ASAP) |
| Ramp Close Time | 0 (ASAP) |
| Setpoint Function | LINEAR |
| Dead Band | AUTO |
| Loss of Signal Position | 0% |
| Loss of Signal Time | 0 seconds |
| Power-on position | 0% |

-continued

| Parameter | Default Value |
|---|---|
| Power-on Delay Time | 0 seconds |
| Lower Limit (Ya) | 0% |
| Upper Limit (Ye) | 100% |
| Tight Shutoff | NO |
| Full Open | NO |
| Brake Time | 0.25 seconds |
| Upper Travel Alarm | 100% |
| Lower Travel Alarm | 0% |
| Curve Data | Linear from 0.0% to 100.0% |

The 21-point FrE1 curve is set to the following values when the factory default parameters are loaded (approximate 1:25 equal percentage positioner response curve):

| Parameter | Value |
|---|---|
| SL0 | 0.0% |
| SL1 | 0.8% |
| SL2 | 2.1% |
| SL3 | 3.2% |
| SL4 | 4.9% |
| SL5 | 6.5% |
| SL6 | 8.4% |
| SL7 | 10.7% |
| SL8 | 13.2% |
| SL9 | 15.7% |
| SL10 | 18.7% |
| SL11 | 22.6% |
| SL12 | 27.2% |
| SL13 | 33.4% |
| SL14 | 40.0% |
| SL15 | 46.0% |
| SL16 | 53.8% |
| SL17 | 63.2% |
| SL18 | 73.7% |
| SL19 | 86.2% |
| SL20 | 100.0% |

The 21-point FrE2 curve is set to the following values when the factory default parameters are loaded (approximate 1:50 equal percentage positioner response curve):

| Parameter | Value |
|---|---|
| SL0 | 0.0% |
| SL1 | 0.3% |
| SL2 | 0.8% |
| SL3 | 1.5% |
| SL4 | 2.6% |
| SL5 | 3.7% |
| SL6 | 5.0% |
| SL7 | 6.6% |
| SL8 | 8.4% |
| SL9 | 10.9% |
| SL10 | 13.5% |
| SL11 | 16.5% |
| SL12 | 20.3% |
| SL13 | 25.0% |
| SL14 | 31.1% |
| SL15 | 36.8% |
| SL16 | 45.4% |
| SL17 | 54.4% |
| SL18 | 67.5% |
| SL19 | 85.0% |
| SL20 | 100.0% |

The 21-point FrE3 and FrE4 curves are set to the following values when the factory default parameters are loaded (linear curve):

| Parameter | Value |
|---|---|
| SL0 | 0% |
| SL1 | 5% |
| SL2 | 10% |
| SL3 | 15% |
| SL4 | 20% |
| SL5 | 25% |
| SL6 | 30% |
| SL7 | 35% |
| SL8 | 40% |
| SL9 | 45% |
| SL10 | 50% |
| SL11 | 55% |
| SL12 | 60% |
| SL13 | 65% |
| SL14 | 70% |
| SL15 | 75% |
| SL16 | 80% |
| SL17 | 85% |
| SL19 | 90% |
| SL20 | 95% |
| SL21 | 100% |

B. LOCAL MODE

Figure 21:
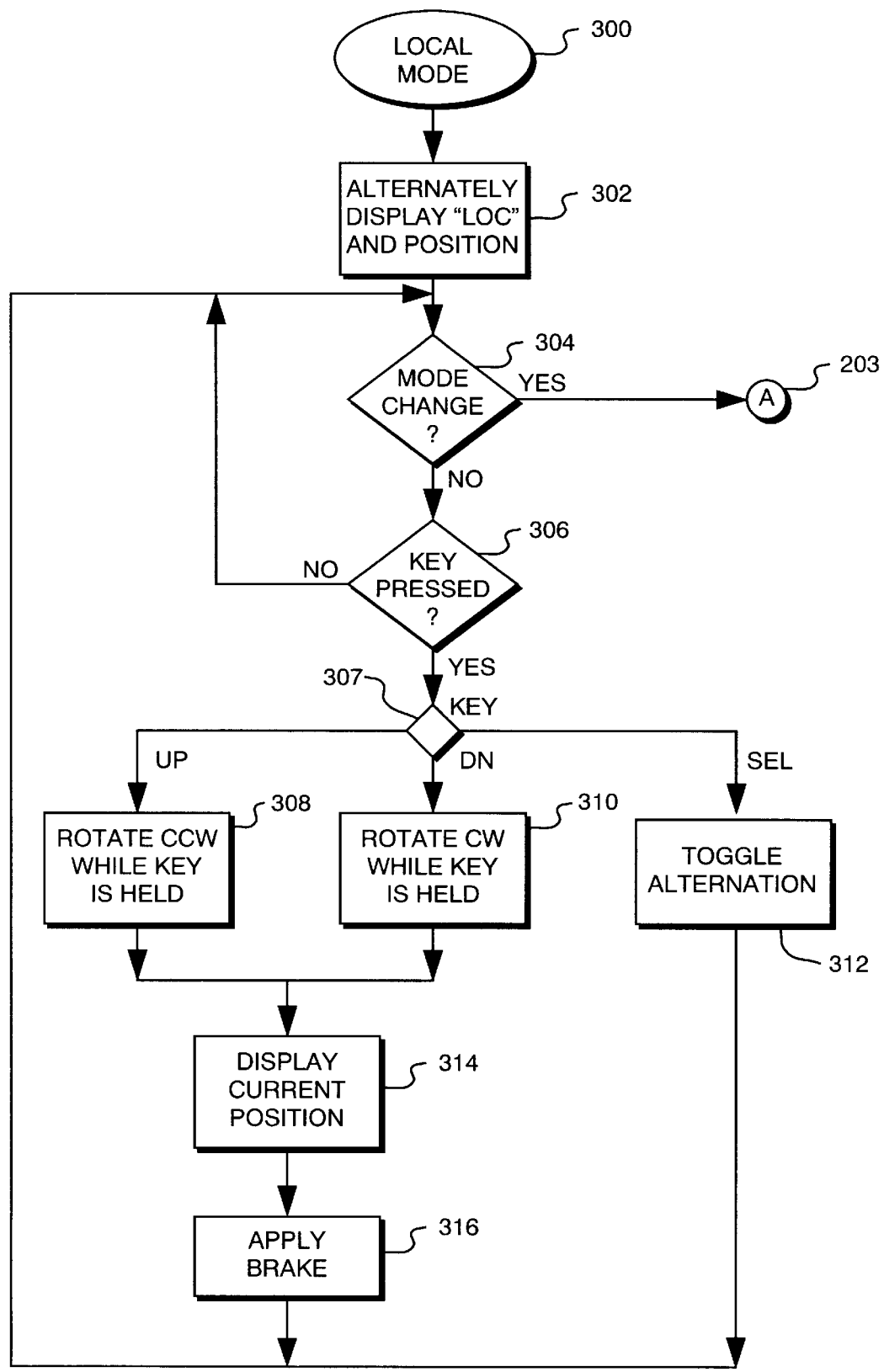
FIG. 21 shows the Local Mode Control Flow Chart.
Figure 22:
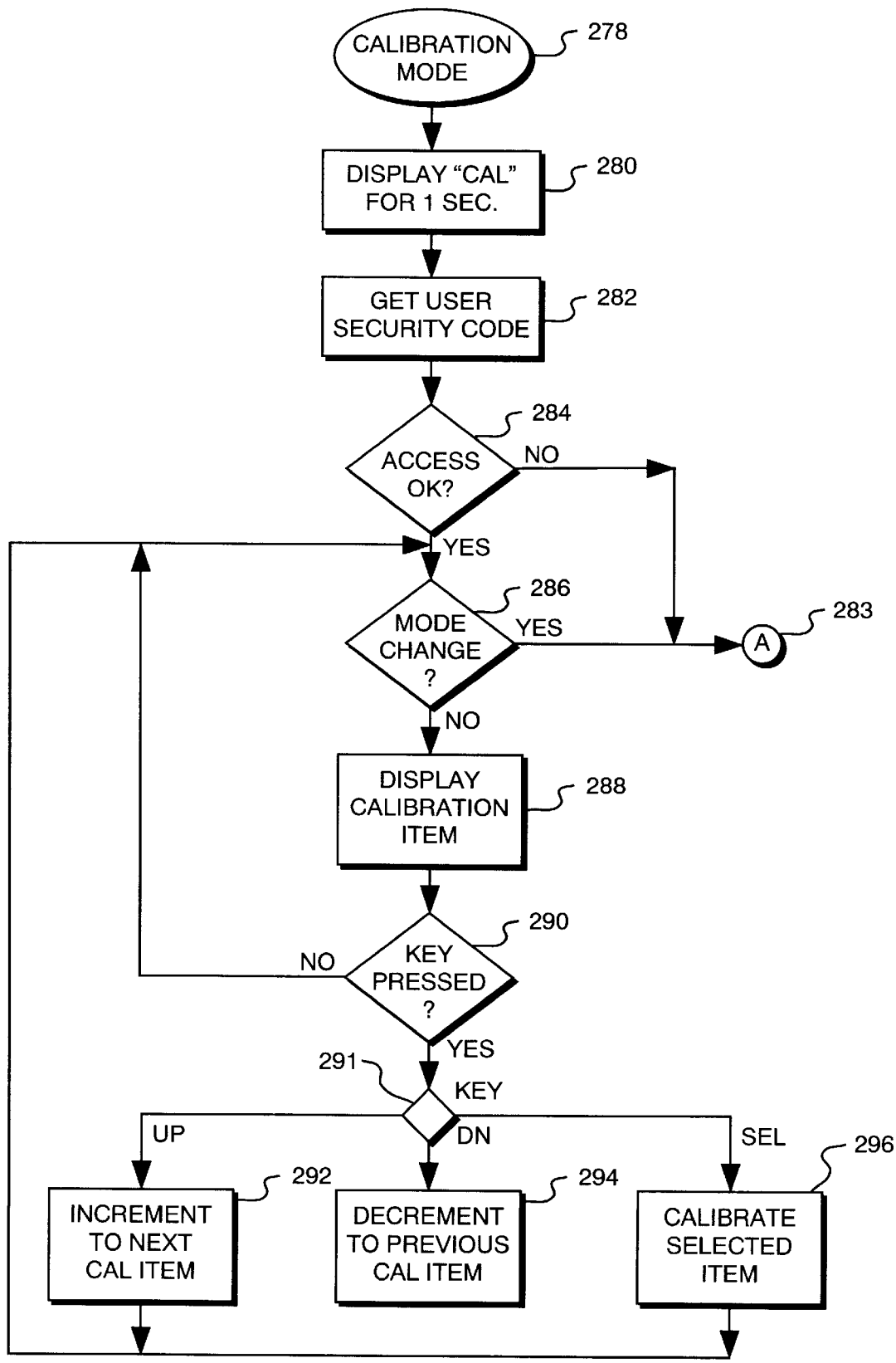
FIG. 22 shows the Calibration Mode Control Flow Chart.

The Local Mode Control Flow Charts is shown in FIG. 21. The Local Mode 300 is provided to allow manual control of the positioner. Local Mode 300 is entered from the Run Mode 236 by holding down the SEL and UP switches simultaneously for three (3) seconds. From the Local Mode, pressing and holding the SEL switch for two (2) seconds returns the positioner to the Run Mode 236. In the Local Mode, the display alternately displays POS and the position of the valve 302. Pressing the SEL switch stops the alternating.

The program checks to see whether there is a mode change 304. If there is a mode change, the program returns at (A) 203 to the Run Mode 236. If there is not a mode change, the program checks to see whether a key is pressed. If no key is pressed, the program returns to step 304 to determine whether there is a mode change. If a key is pressed 306, the program checks to see which key is pressed 307. If the SEL key is pressed, the program goes to Toggle Alternate 312 and proceeds back to step 304 to determine whether there is a mode change. If the UP key is pressed, the positioner rotates the valve in the counterclockwise direction while the key is held 308. If the DOWN key is pressed, the positioner rotates the valve in the clockwise direction while the key is held 310. After the UP or DOWN switch is pressed and let up, the positioner displays the current position 314, and applies the brakes for the programmed brake time 316. It then returns to step 304 to see whether there is a mode change.

C. FEEDBACK CALIBRATION ROUTINE AND CYCLE TIME MEASUREMENT

The Calibration Mode Control Flow Program is shown in FIG. 22. This mode has three procedures: (i) Position Endpoint Calibration, (ii) Input Signal Calibration, and (iii) Cycle Time Measurement. Any one or all of these procedures may be performed. A series of menu selections allows the user to select which of the desired calibration procedures is to be performed.

Normally the positioner is calibrated at the time of manufacture for 90 degree travel and the appropriate signal range, but if the user's signal range is not an exact standard range (e.g. 4–20 ma.), the positioner should be calibrated to the user's signal range (e.g. 4.05–19.88 ma.).

There are three parameters which may be calibrated while in the calibrate mode (pressing the UP switch will cycle through the three parameters):

a. CAPO is the shaft position calibration to show the microprocessor exactly where there closed position of the value is. As part of this procedure, the calibration of the feedback potentiometer may be checked and set.

b. CASE is the 4–20 ma input signal calibration to show the microprocessor what the full clockwise and full counterclockwise signal values are.

c. CACy is the shaft 90 degrees travel time both clockwise and counterclockwise for diagnostic and alarm functions.

As shown in FIG. 22, when first entering the Calibration Mode 278, the display shows CAL for one second 280 and then begins alternating between CodE and 0000. After the security code is entered 282, the program checks to see whether access is proper. If access is not proper, it returns at (A) to the Run Mode 236. If the access is proper, the program checks to see whether there is a mode change 286. If there is a mode change, the program returns at (A) to Run Mode 236. If there is no mode change, the program displays the calibration item 288, and then checks to see whether a key is pressed. If no key is pressed, the program returns to step 286 to determine whether there is a mode change. If a key is pressed, the program determines which key is pressed 291. If the UP key is pressed, the program increments to the next calibration item 292 and returns to ask whether there is a mode change 286. If the DOWN key is pressed, the program decrements to the previous calibration item and returns to ask whether there is a mode change 286. If the SEL key is pressed, it calibrates the selected item 296 and returns to ask whether there is a mode change 286.

As noted above, CAPO is the parameter used to calibrate shaft position and the feedback potentiometer. To calibrate shaft position or the feedback potentiometer, the user momentarily presses the SEL switch. The display then begins flashing between PoC and the actual voltage from the feedback potentiometer [at step 296?]. The UP and DOWN switches are used to position the actuator to the full clockwise position. With the actuator shaft in the full clockwise position, the voltage reading on the display should be between 0.200 and 0.400 volts. If it is not, the large crown gear which engages the pinion gear on the feedback potentiometer should be rotated until the reading on the display is correct. At this point, momentarily pressing the SEL switch accepts the value. The display then begins flashing between POCC and the voltage reading from the potentiometer. The UP switch is used to bring the actuator shaft to the full counterclockwise position. The voltage shown on the display should be greater than 3.000 volts. The user momentarily presses the SEL switch accepts this value. The display then begins flashing between CAPO and no. The positioner is then calibrated for shaft position. Momentarily pressing the UP switch will advance the display to flash between CASE and no.

CASE is the parameter used to calibrate the positioner to the users input signal range. To perform the calibration, momentarily press the SEL switch. The display begins flashing between SEC and the voltage derived from the input signal. At this time, the user should decrease the input signal to the low end of the signal range which is typically 4.0 ma. Pressing the SEL switch accepts this value (typically less than 1 volt) and the display begins flashing between SECC and the voltage derived from the input signal. The user should then increase the signal to the upper end of the input signal range. Pressing the SEL switch accepts this value (typically greater than 4 volts) and the display begins flashing between CASE and no. The input signal range is then calibrated. Momentarily pressing the UP switch advances to the next parameter.

CACy is the parameter that is used to calibrate the positioner 90 degree travel time for both clockwise and counterclockwise travel. When the display is flashing between CACy and no, momentarily pressing the SEL switch will begin the calibration procedure. If the actuator shaft is not initially in the full Counterclockwise position, it will first travel to that position and then travel to the full clockwise position and then back to the full counterclockwise position. The time values get stored in nonvolatile memory. When the display again begins flashing between CACy and no, the calibration is complete.

Any one of the calibrations can be done at any time, but if more than one calibration is to be done, they should be done in the above order. After the calibration has been completed, the SEL switch must be pressed for about 3 seconds to return to the run mode. Pressing the SEL switch for 3 seconds after the completion of any of the above calibration procedures will return the positioner to the Run Mode.

D. RUN MODE

Figure 23:
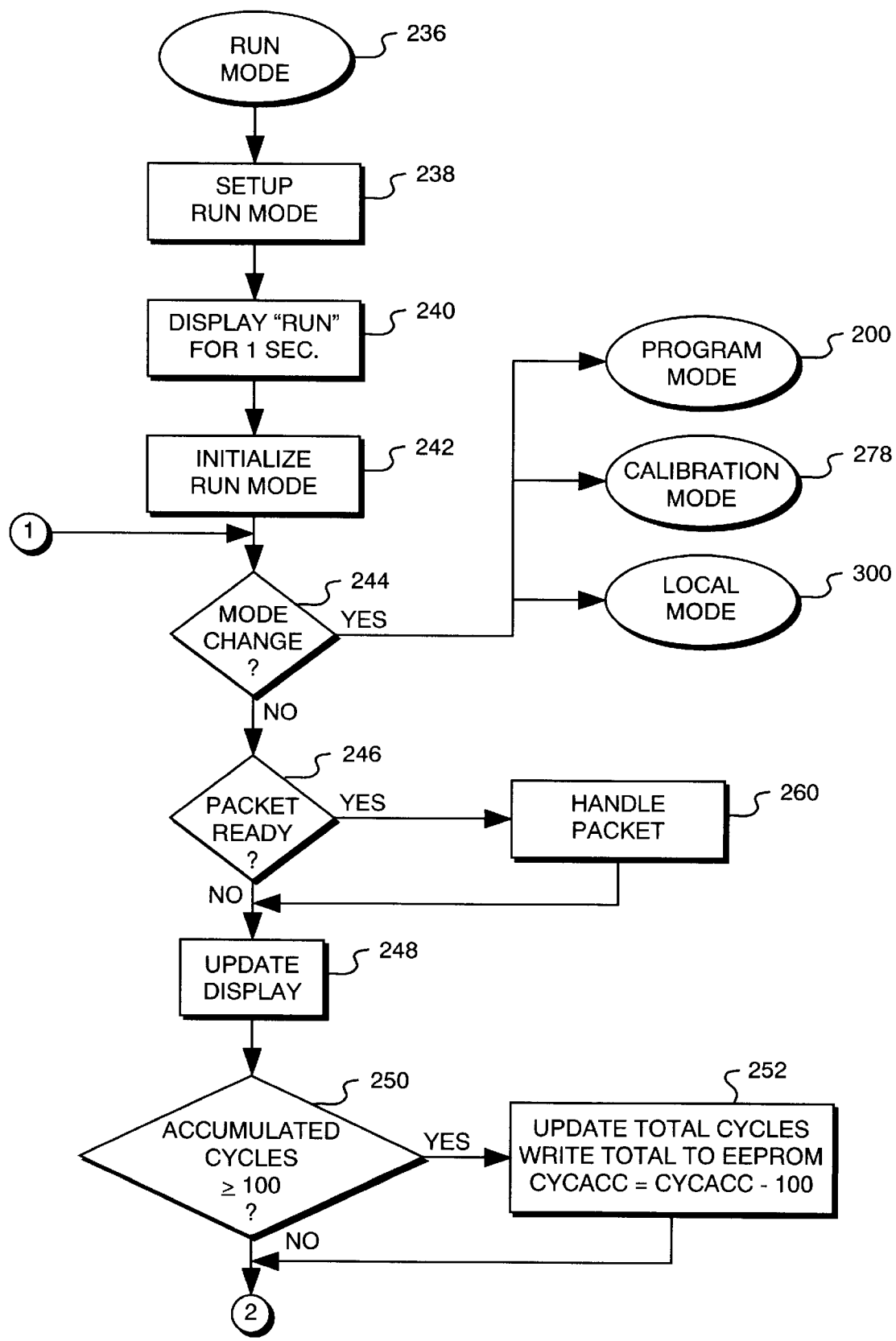
FIGS. 23(a) and (b) show the Run Mode Control Flow Chart.
Figure 23:
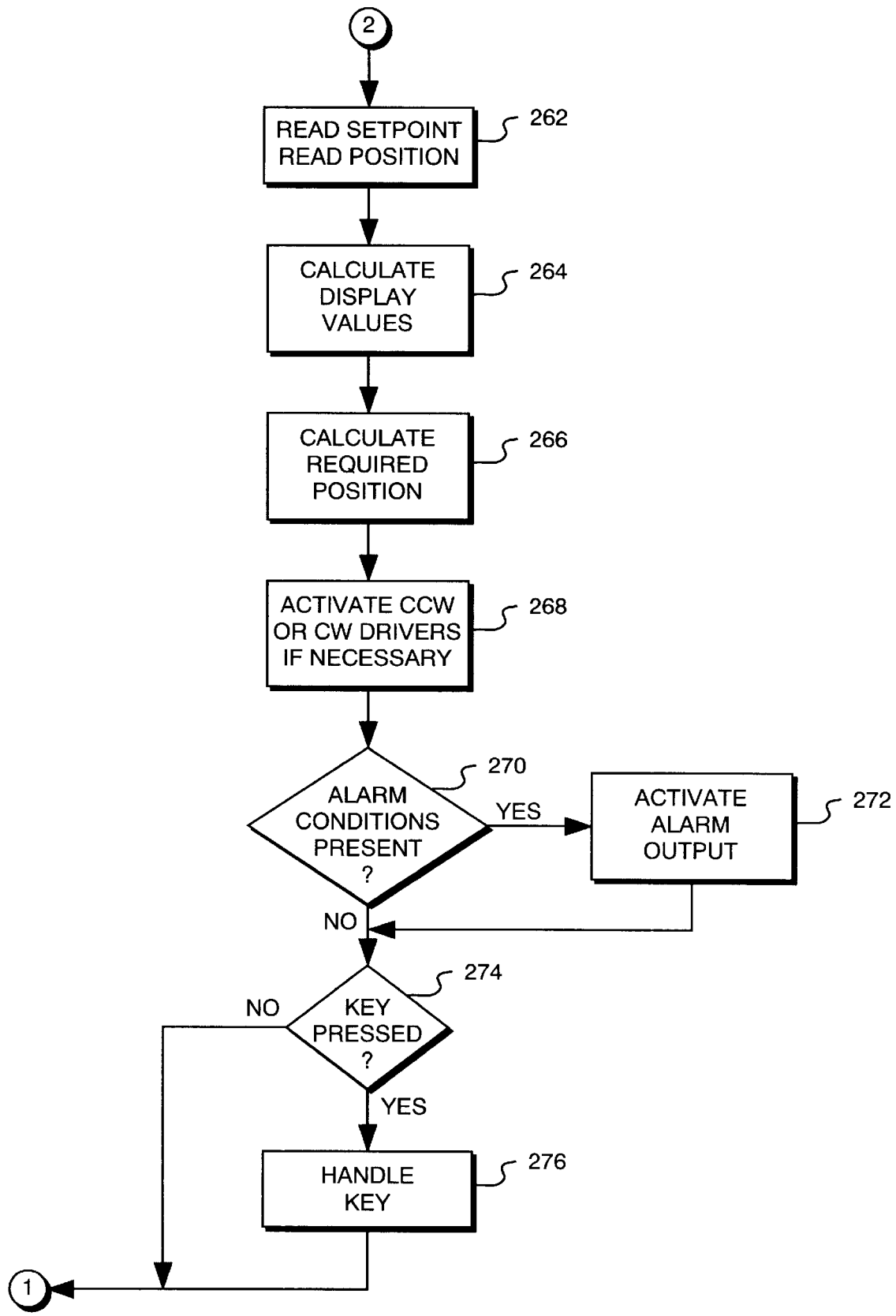

The Run Mode Control Flow Chart is shown in FIGS. 23(a) and (b). In the Run Mode 236, the full clockwise (closed) position produces either 0 ma current output (for the 0–20 ma range) or 4 ma current output (for the optional 4–20 ma range). The full counterclockwise (open) position always produces a 20 ma output. This output does not require calibration.

In the Run Mode 236 the program goes to the Setup Run Mode 238, and then displays "run" for one (1) second 240. It then initializes the Run Mode 242 and checks to see whether there is a mode change 244. If there is a mode change, the program goes to the desired mode (i.e. Program Mode 200, Calibration Mode 278, or Local Mode 300). If there is no mode change, the program checks to see whether the command packet is ready 246. If the command packet is ready, the program handles the packet 260, and updates the display 248. If the packet is not ready, the computer updates the display 248. The computer then checks to see whether the number of accumulated cycles is greater than or equal to 100. If it is, the computer updates the total cycles write total to EEPROM (CYCACC=CYACC−100) 252. If the number of accumulated cycles is less than 100, the program proceeds directly to the Read Setpoint Read Position 262. It then calculates the display values 264, calculates the required position 266, and activates the clockwise or counterclockwise drivers if necessary 268. It then checks to see whether alarm conditions are present 270. If they are, the program activates alarm output 272. If alarm conditions are not present, the program checks to see whether a key is pressed. If a key is pressed, it handles the key 276, and returns to step 244 to determine whether there is a mode change. If no key is pressed, the program returns directly to step 244 to determine whether there is a mode change.

The valve actuator "run" mode display 240 depends upon how the digital positioner board is configured. Seven (7) Run Mode display screens are provided: POS, Set, CyCn, dbnd, CyC, CyCC, and Alr. The UP and DOWN switches are used to sequence to the next or last screen when the parameter name screen is displayed. For each of the seven Run Mode display screens, the display alternates between the name and its value. Pressing the SEL switch locks the value on the screen. The Valve Position Screen display alternately displays POS and xx.x (the valve position in percent). The Input Setpoint display alternately displays Set and xx.x in percent. The Cycle Count display alternately displays CYCN and the total run mode cycles. The Deadband Readout display alternately displays the dbnd and the current dead band value.

The Clockwise and Counterclockwise Travel Time Readout alternately displays between CyC and the calibrated time it took (in seconds) to go from the full counterclockwise position to the full clockwise position. Pressing the SEL key then shows the counterclockwise time. The display alternates between CyCC and the calibrated time it took (in seconds) to go from the full clockwise position to the full counterclockwise position. This is useful for comparing calibrated times with current times.

The Alarm Status Readout display alternately displays the Alr and the current alarm condition. A high limit alarm condition displays Hi; a low alarm condition displays Lo; a deviation alarm condition displays De; and a thermal alarm (for DC only) displays ther. Since only one alarm condition can be shown on the display, the deviation alarm takes priority over the other alarms. When the deviation alarm is no longer active, the other alarms will be shown as described above.

Modes change whenever the SEL switch is held down for at least three (3) seconds. In the Run Mode, holding down the SEL switch alone for three (3) seconds switches to the Program Mode. In the Run Mode, holding down the SEL and DOWN switches simultaneously for three (3) seconds will enter the Calibration Mode. Holding down the SEL and UP switches simultaneously for three (3) seconds will enter the Local Mode. When the Program Mode is entered, Prog is briefly displayed before the sequence described in the Program Mode Control Program begins. Pressing and holding the SEL switch in the Program Mode exits and returns to the Run Mode. When the Local Mode is entered, Loc is briefly displayed before the sequence described in the Local Mode Control Flow Program begins. Pressing and holding the SEL switch in the Calibration Mode will exit and return to the Run Mode. When the Run Mode is re-entered, run will be displayed briefly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and there is no intention to exclude any equivalents thereof. Hence it is recognized that various modifications are possible within the scope of the present invention as claimed.

What is claimed is:

1. A programmable positioner for positioning a device comprising:

a microprocessor having at least run and program modes, the microprocessor including a parameter memory for storing a plurality of programmable parameters including:

Setpoint Direction,

Output Current Range,

Setpoint ramp—time to open, and

Setpoint ramp—time to close, the microprocessor, in the run mode executing a sequence of operations to control the position of a device, and in the program mode executing a sequence of operations to respond to commands directing the storage of selected values in the parameter memory, and the microprocessor including means operating in the run mode, for applying the stored values for the parameters of:

Setpoint Direction,

Output Current range,

Setpoint ramp—time to open, and

Setpoint ramp—time to close.

2. The programmable positioner of claim 1 wherein the device whose position is controlled is a shaft whose rotational position is controlled and wherein the Setpoint Direction parameter can take on one of rise or fall values, the Output Current Range parameter can take on either a 0–20 ma range value or a 4–20 ma range value, and the Setpoint ramp—time to open and Setpoint ramp—time to close parameters can each take on integer values.

3. The programmable positioner of claim 1 in which the programmable parameters further include:

Setpoint split range—start,

Setpoint split range—end, and setpoint function.

4. The programmable positioner of claim 3 wherein the setpoint function parameter identifies a particular relationship between position command current input and position.

5. A system for controlling a plurality of valves including a control computer, a plurality of programmable positioners and a communication link connecting the control computer and each of the programmable positioners, each valve associated with one of the programmable positioners, each programmable positioner comprising:

a microprocessor having at least run and program modes, the microprocessor including a parameter memory for storing a plurality of programmable parameters including:

Setpoint Direction,

Output Current Range,

Setpoint ramp—time to open, and

Setpoint ramp—time to close, the microprocessor, in the run mode, executing a sequence of operations to control the position of the associated valve, and in the program mode executing a sequence of operations to respond to commands from the control computer, and received over the communication link, directing the storage of selected values in the parameter memory, and the microprocessor including means operating in the run mode for applying the values for the parameters of:

Setpoint Direction,

Output Current range,

Setpoint ramp—time to open, and

Setpoint ramp—time to close.

6. The system of claim 5 wherein the valve includes a shaft whose rotational position is controlled and wherein the Setpoint Direction parameter can take on one of rise or fall values, the Output Current Range parameter can take on either a 0–20 ma range value or a 4–20 ma range value, and the Setpoint ramp—time to open and Setpoint ramp—time to close parameters can each take on an integer value.

7. The system of claim 5 in which the programmable parameters further include:

Setpoint split range—start,
Setpoint split range—end, and
setpoint function.

8. The system of claim 7 wherein the setpoint function parameter identifies a particular relationship between position command current input and position.

* * * * *

UNITED STATES PATENT AND TRADEMARK OFFICE
CERTIFICATE OF CORRECTION

PATENT NO. : 5,848,609
DATED : December 15, 1998
INVENTOR(S): Marchesseault et al It is certified that error appears in the above-identified patent and that said Letters Patent is hereby corrected as shown below:

Title Page, Item [73] Assignee should read ---Worcester Controls Licenseco, Inc.---

Signed and Sealed this

Eleventh Day of May, 1999

Attest:

Q. TODD DICKINSON

*Attesting Officer*  *Acting Commissioner of Patents and Trademarks*